No. 734,434. PATENTED JULY 21, 1903.
W. F. SCHACHT.
PNEUMATIC TIRE.
APPLICATION FILED MAY 25, 1903.
NO MODEL.

Witnesses
Inventor.
Wm. F. Schacht,
By Alexander & Dowell
Attorneys

No. 734,434. Patented July 21, 1903.

UNITED STATES PATENT OFFICE.

WILLIAM F. SCHACHT, OF GOSHEN, INDIANA.

PNEUMATIC TIRE.

SPECIFICATION forming part of Letters Patent No. 734,434, dated July 21, 1903.

Application filed May 25, 1903. Serial No. 158,737. (No model.)

*To all whom it may concern:*

Be it known that I, WILLIAM F. SCHACHT, of Goshen, in the county of Elkhart and State of Indiana, have invented certain new and useful Improvements in Pneumatic Tires; and I hereby declare that the following is a full, clear, and exact description thereof, reference being had to the accompanying drawings, which form part of this specification.

This invention is an improvement in pneumatic and cushion tires, especially those designed for bicycles and automobile vehicles. Its object is to produce a practically impervious or puncture-proof tire out of rubber or rubber composition which when completed will be practically a unitary tire, while the tread portion thereof will contain a reinforcing unpuncturable portion. This portion is formed of a vulcanized rubber composition so compounded as to render it exceedingly tough, durable, practically unpuncturable, and withal sufficiently flexible and pliable when made or cut into thin strips and incorporated into the tread portions of pneumatic tires as to render them practically punctureproof without destroying the desirable and necessary qualities of lightness and flexibility of such tires.

Heretofore it has been proposed to manufacture pneumatic tires by inserting thereon or embedding therein bands or strips of metal, rawhide, &c.; but such materials, while in a degree non-puncturable, are seriously objectionable, because, for example, the metal armor cannot be connected externally in a durable way to the tire without injuring its resilient qualities, and if embedded in the tire the metal gradually splits the tire and soon renders it useless or repairs necessary, and it also impairs its "liveliness." It has also been proposed to impregnate the tread portion of the tire with materials which would render it hard and unpuncturable; but this has not proven successful, because to vulcanize the tire to the point of hardness would destroy its utility, and a soft tire is readily punctured.

My present invention produces a tire practically unpuncturable, made almost wholly of rubber or rubber composition, and which is also practically unitary, but not homogeneous in composition, and as "lively" as is desirable for a tire.

The invention is summarized in the claims, and the accompanying drawings illustrate the same as embodied in a pneumatic tire.

Figure 1:
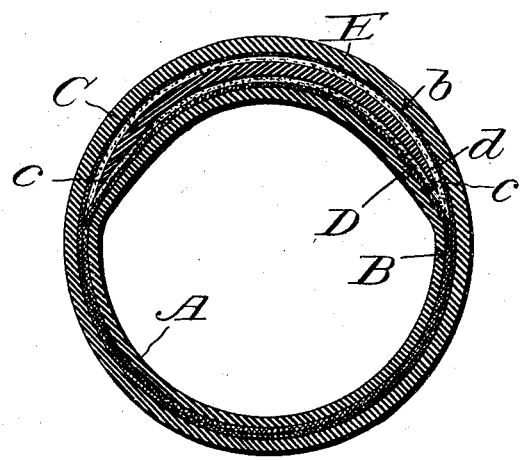
Figure 2:
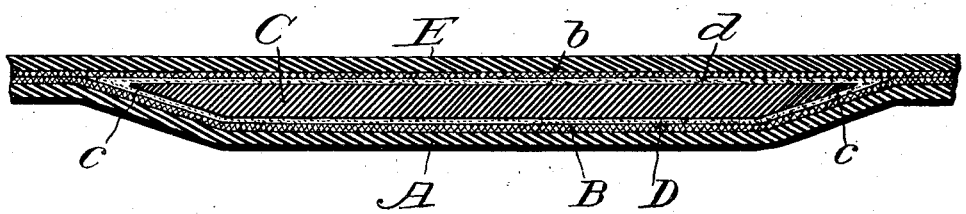

Figure 1 is an enlarged cross-sectional view of a single-tube pneumatic tire, and Fig. 2 an enlarged sectional view showing the mode of assembling the parts.

The most important part of the tire is the novel hard-rubber armor or tread strip, which is preferably composed of the following ingredients in substantially the proportions stated: Pará gum, twenty-eight pounds; whiting, thirty-two pounds; lime, three pounds; vegetable or wool fibers, six pounds; asbestos, eleven pounds; sulfur, six pounds, to which may be added one pound of antimony and enough Venetian red or other pigment to color the mass. These ingredients are thoroughly incorporated into a dough-like mass. This mass is then pressed or molded into sheets or strips of any desired thickness and width, vulcanized, and cut thereafter into strips having a cross-section, as shown at C in the drawings, or the mass may be molded into such strips before vulcanization. The edges of the strips C being preferably tapered, as at *c c*, the vulcanizing process is continued until the product is dense and hard, but slightly pliable, in which condition the composition will be almost impenetrable, but comparatively light and flexible. This vulcanization of the composition is an important feature of the manufacture of the tire. I then proceed to build the tires as follows: For a simple single-tube bicycle-tire I take a layer of raw rubber of desired thickness and width for the inner casing or tube of the tire, (indicated at A,) over this place a layer of fabric B, upon this place the armor-strip C, which should be placed between or surrounded by a thin sheet of raw rubber, (indicated at D *d*,) over this a second layer of fabric *b*, and on top a layer of rubber E of proper thickness and size for the outer casing. These are all placed on a suitable form and vulcanized to permanently unite and incorporate the parts together. The hard-rubber composition strip C becomes permanently embedded in the tread portion of the tube and inseparably connected with the same by reason of the fluxing of the rubber, the fabric serving as a bond between the layers and becoming inseparably embedded therein. This vulcanization of the tire cannot be carried to the point of hardening the rubber, else the tire would be worthless. Therefore it is imperatively necessary in order to produce my tire that the armor-strip be first vulcanized, as described, and afterward incorporated with the other uncured parts of the tire by subsequent milder vulcanization.

The foregoing describes the process of making a simple single-tube pneumatic armored tire of solid-rubber composition, the tread portion of which possesses different degrees of hardness, and yet is practically unitary, something never before attained to my knowledge, and the resultant tire is lively, resilient, durable, tough, and practically puncture-proof, the armor being incorporated inseparably with the other parts of the tire and will not split or separate the layers, as an armor of foreign substance would do, because of the impossibility of making an absolutely fast joint between rubber and other material where the joint is subjected to constant manipulation, such as the tread portion of a tire has to undergo.

In practice it takes about an hour's time under a pressure of about sixty pounds of steam to vulcanize the composition for the armor, whereas it takes only about twelve minutes to vulcanize the complete tire after the parts are assembled as described under the same steam-pressure. It is impossible, therefore, to place the raw mixture for the armor into the tire and vulcanize it to the necessary hardness simultaneously with the vulcanization of the tire. The fabric layers are placed in the tires, as customary, to prevent undue expansion of the tube, but do not prevent the merging of the rubber parts into practically one continuous piece having soft exterior and interior surfaces and an impenetrable interior tread portion vulcanized previously to a greater degree of hardness than the other portions of the tire. If desired, the armor-strips can be coated with rubber-cement before being placed in the tire to facilitate adhesion of the parts.

Having thus described my invention, what I therefore claim as new, and desire to secure by Letters Patent thereon, is—

1. A pneumatic tire, composed of an impervious hard previously-vulcanized composition rubber band or strip located in the tread portion of the tire, a rubber sheet around the strip, layers of fabric, and an inner and an outer layer of rubber, all vulcanized together to unite the parts intimately, substantially as described.

2. A puncture-proof pneumatic tire, comprising inner and outer concentric rubber tubes, concentric layers of fabric between the tubes, and an annular strip of hard previously-vulcanized rubber composition interposed between the fabric layers and located in the tread portion of the tire, all the parts being intimately united by vulcanizing them when assembled.

3. A punctureless pneumatic tire, composed of an inner and outer layer of rubber, intermediate layers of fabric, a previously-vulcanized hard impervious tread-strip interposed between the layers of fabric in the tread portion of the tire, and a layer of soft rubber between the strip and fabrics, all vulcanized together to unite the parts inseparably, substantially as specified.

4. A punctureless pneumatic tire, composed of an inner and outer layer of rubber, intermediate layers of fabric, a previously-vulcanized hard impervious tread-strip interposed between the layers of fabric in the tread portion of the tire, said strip being composed of gum, whiting, lime, asbestos, fibers, sulfur, antimony, and a coloring substance, and a layer of soft rubber between the strip and fabrics, all vulcanized together to unite the parts inseparably, substantially as specified.

In testimony that I claim the foregoing as my own I affix my signature in presence of two witnesses.

WILLIAM F. SCHACHT.

Witnesses:
ARTHUR E. DOWELL,
JAMES R. MANSFIELD.